(12) United States Patent
Spada et al.

(10) Patent No.: US 8,619,090 B2
(45) Date of Patent: Dec. 31, 2013

(54) TEXT IMPORT TOOL FOR A TECHNICAL COMPUTING ENVIRONMENT

(71) Applicant: The MathWorks, Inc., Natick, MA (US)

(72) Inventors: Richard A. Spada, Millis, MA (US); James G. Owen, Bolton, MA (US); Felix Alvarez, Natick, MA (US); Robert I. Jacobs, Medway, MA (US); Abigail S. Skofield, Bolton, MA (US); Arun Koushik Parthasarathy, Jamaica Plain, MA (US); Claudia G. Wey, Wayland, MA (US)

(73) Assignee: The Mathworks, Inc., Natick, MA (US)

( * ) Notice: Subject to any disclaimer, the term of this patent is extended or adjusted under 35 U.S.C. 154(b) by 0 days.

(21) Appl. No.: 13/827,942

(22) Filed: Mar. 14, 2013

(65) Prior Publication Data

US 2013/0205192 A1    Aug. 8, 2013

Related U.S. Application Data

(63) Continuation-in-part of application No. 13/241,462, filed on Sep. 23, 2011, now Pat. No. 8,543,939.

(51) Int. Cl.
*G09G 5/00* (2006.01)
*G06F 17/00* (2006.01)

(52) U.S. Cl.
USPC ............................................ 345/581; 715/212

(58) Field of Classification Search
None
See application file for complete search history.

(56) References Cited

U.S. PATENT DOCUMENTS

2008/0222510 A1*   9/2008   Nguyen et al. ................ 715/212

* cited by examiner

*Primary Examiner* — Aaron M Richer
*Assistant Examiner* — Mohammad H Akhavannik
(74) *Attorney, Agent, or Firm* — Harrity & Harrity, LLP

(57) ABSTRACT

A device receives text that includes data values, and parses the text to identify data types associated with the data values. The device generates, based on the data values and the data types, a graphical representation of the text that includes data cells corresponding to the data values, and provides the graphical representation for display. The device receives one or more selections of one or more data cells in the graphical representation, stores the one or more selections as a selection history, and provides the selection history for display.

26 Claims, 20 Drawing Sheets

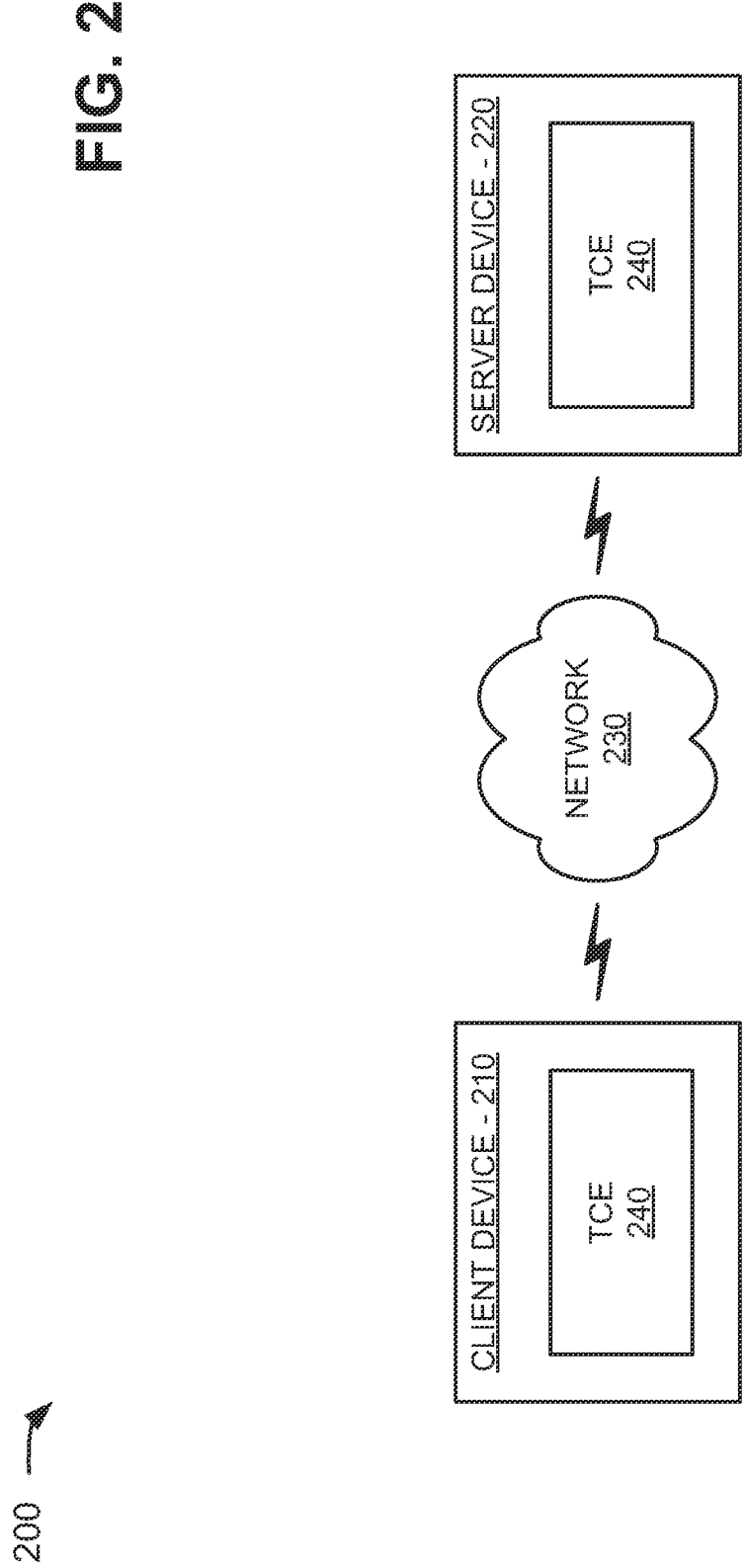

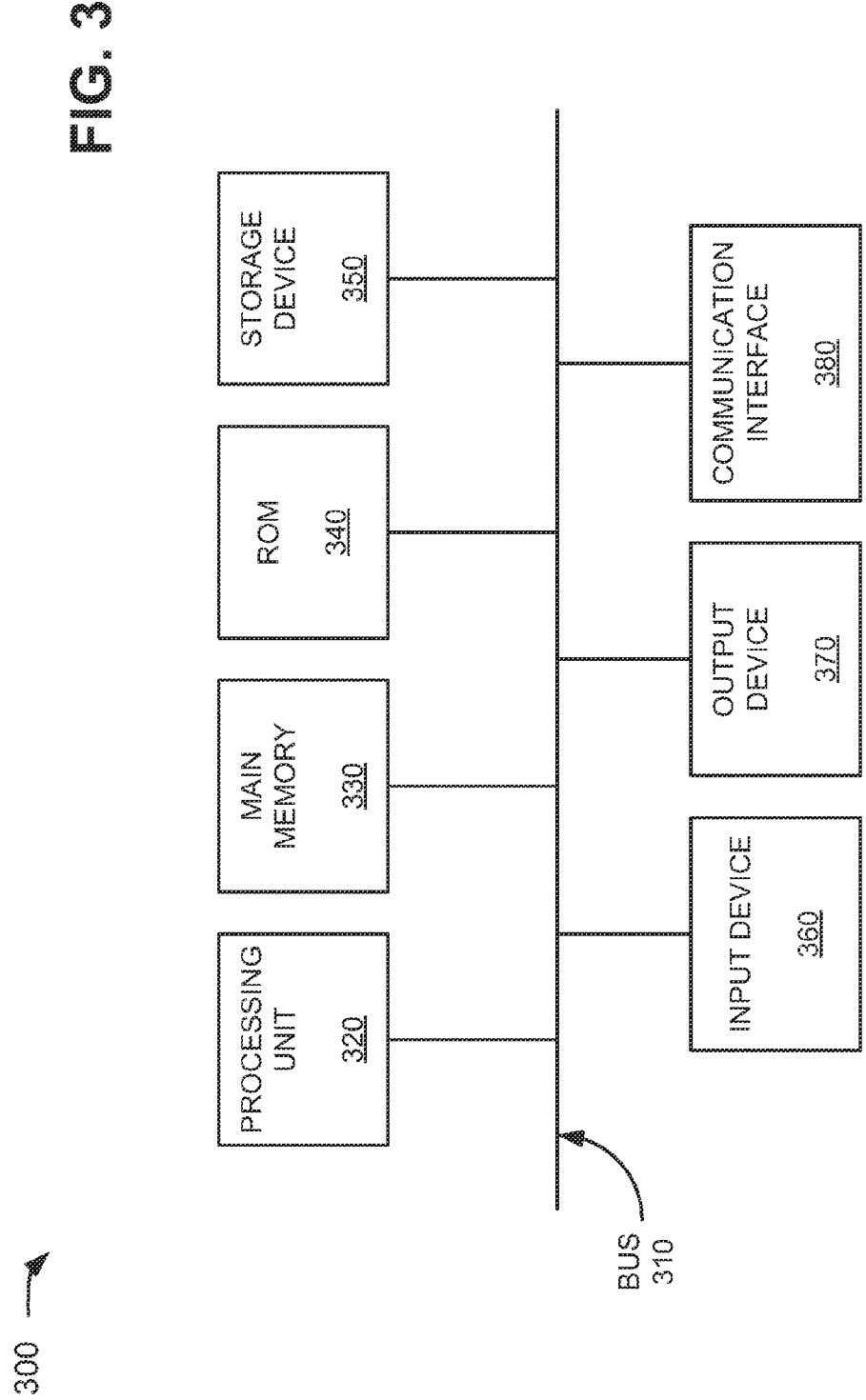

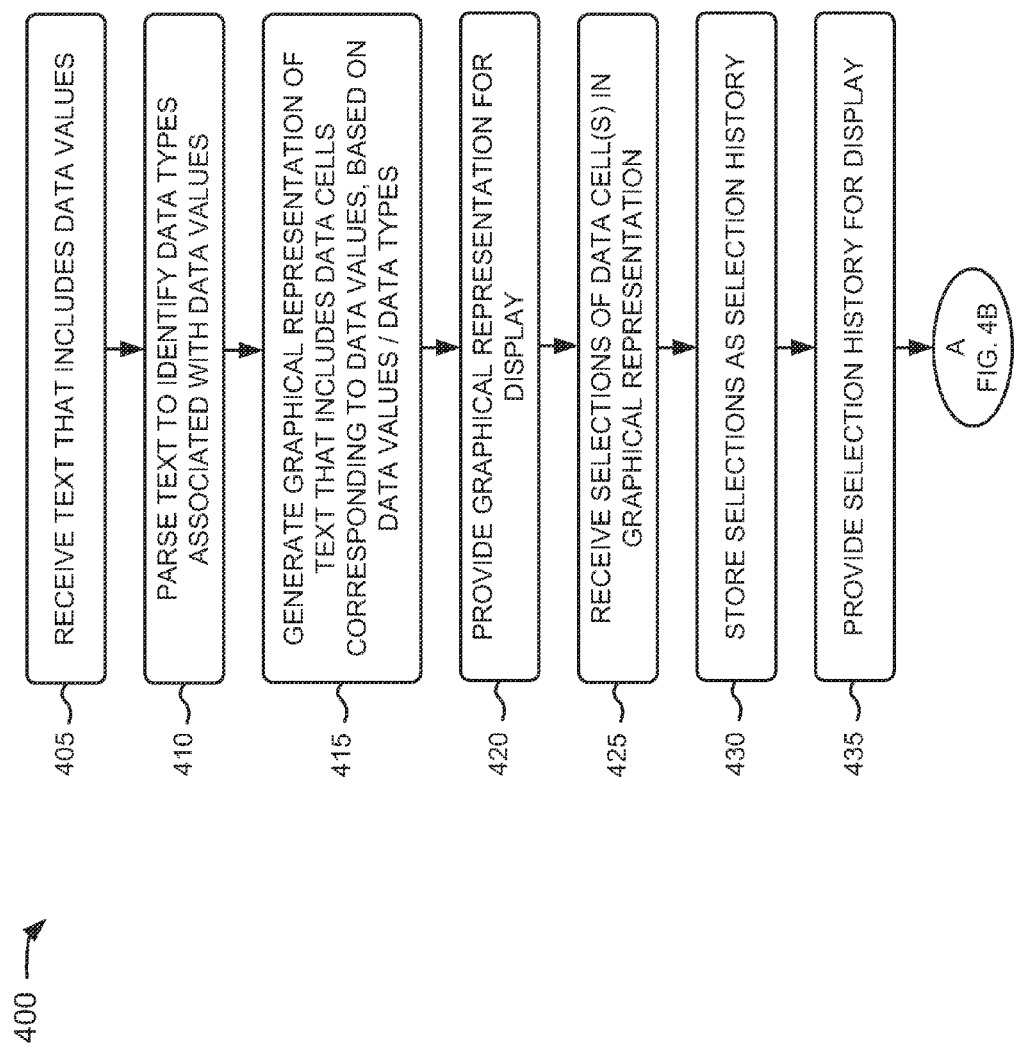

FIG. 7

| | A | B | C | D | E | F |
|---|---|---|---|---|---|---|
| | UtilityID ▼ | Name | Nation | Date | Residen | Residen | Total Revenue |
| | NUM ▼ | TEXT ▼ | TEXT ▼ | DATE ▼ | TEXT ▼ | TEXT ▼ | NUMBER ▼ ← 710 |
| 1 | UtilityID | Name | Nation | Date | | | Total Revenue |
| 2 | 213 | Acqua | Italy | 1-Oc | | | 1,239,654 |
| 3 | 213 | Acqua | Italy | 1-Oc | | | 5,458,902 |
| 4 | 213 | Acqua | Italy | 1-Oc | | | 8,765,112 |
| 5 | 213 | Acqua | Italy | 1-Oc | | | 7,656,901 |
| 6 | 213 | Acqua | Italy | 1-Oc | | | 9,876,432 |
| 7 | 213 | Acqua | Italy | 1-Oc | | | 5,347,023 |
| 8 | 213 | Acqua | Italy | 1-Oc | | | 6,894,367 |
| 9 | 213 | Acqua | Italy | 1-Oc | | | 3,987,123 |

720 → TEXT (string) [Apply to Selection]
740 →
730

NUMBER (double)
NUMBER

DATETIME (datetime)
dd-mm-yyyy HH:MM:SS
dd-mm-yyyy
mm/dd/yyyy HH:MM:SS
mm/dd/yyyy
mm/dd
HH:MM:SS

| | Price | Price/unit | Mileage |
|---|---|---|---|
| | 0 | 0 | 0 |
| | 0 | 0 | 0 |
| | 10.9843 | 0.9854 | 203 |
| | 19.0845 | 1.0256 | 500 |
| | 33.7799 | 1.0008 | 400 |

Column delimiters:

Delimiter ▶

STANDARD DELIMITERS
☒ Tab
☒ Comma
☐ Space
☐ Semicolon

SUGGESTED DELIMITERS
☐ *  ← 1130

CUSTOM DELIMITERS
☒ @~@  ← 1140

1110 — Delimiter
1120 — Standard Delimiters
1100

FIG. 13

| A | B | C | D | E | F | G |
|---|---|---|---|---|---|---|
| GrpID | Base | T01 | T02 | T03 | T04 | T05 |
| NUM ▶ | NUM ▶ | NUM ▶ | NUM ▶ | NUM ▶ | NUM ▶ | NUM ▶ |
| GrpID# | Baseline | T01 | T02 | T03 | T04 | T05 |
| xLM621 | 181 | 124 | 156 | 127 | 187 | 191 |
| xLM622 | 274 | 256 | 233 | 275 | 213 | 297 |
| xLM623 | 278 | 389 | 378 | 312 | 327 | 338 |

Variable Names Row: 4

| | A | B | C | D | E | F | G |
|---|---|---|---|---|---|---|---|
| | UtilityID ▶ | Name ▶ | Nation ▶ | Date ▶ | Residen ▶ | Residen ▶ | Total Revenue ▶ |
| | NUM ▶ | TEXT ▶ | TEXT ▶ | DATE ▶ | TEXT ▶ | TEXT ▶ | NUMBER ▶ |
| | UtilityID | Name | Nation | Date | Resident | Resident | Total Revenue |
| | 213 | Acqua | Italy | 1/1/2009 | | | |
| | 213 | Acqua | Italy | 733833 | 111,232 | 982,347 | 8,765,112 |
| | 213 | Acqua | Italy | 4/1/2009 | 792,451 | 89,004 | 7,656,901 |
| | 213 | Acqua | Italy | 5/1/2009 | 950,782 | 115,893 | 9,876,432 |
| | 213 | Acqua | Italy | 6/1/2009 | 843,212 | 349,021 | 5,347,023 |
| | 213 | Acqua | Italy | 7/1/2009 | 697,000 | 453,785 | 6,894,367 |
| | 213 | Acqua | Italy | 8/1/2009 | 258,915 | 621,987 | 3,987,123 |

TOOLTIP (1510) → [3/1/2009 Converted to [Type: Date/Time, Value: 733833]]

CONVERTED VALUE (1520) → 733833

1500

TEXT IMPORT TOOL FOR A TECHNICAL COMPUTING ENVIRONMENT

RELATED APPLICATION

This application is a continuation-in-part of U.S. patent application Ser. No. 13/241,462, filed on Sep. 23, 2011, the entire contents of which are hereby incorporated by reference.

BRIEF DESCRIPTION OF THE DRAWINGS

The accompanying drawings, which are incorporated in and constitute a part of this specification, illustrate one or more implementations and, together with the description, explain these implementations. In the drawings:

FIG. 2 is a diagram of an example environment in which systems and/or methods described herein may be implemented;

FIG. 3 is a diagram of example components of one or more of the devices of the environment depicted in FIG. 2;

FIGS. 4A and 4B are flow charts of an example process for using a text import tool;

FIG. 7 is a diagram of example operations for inferring default data types for data values of a text file and for enabling the data types to be edited;

FIG. 11 is a diagram of example operations for inferring delimiters for a text file, allowing delimiters to be conditionally applied, and allowing custom delimiters to be defined;

FIG. 13 is a diagram of example operations for defining a header row selector for a text file, selecting a default header row for the text file, and displaying editable names from the header row;

FIG. 15 is a diagram of example operations for explaining how text is parsed and for overlaying the converted text over original text;

DETAILED DESCRIPTION

The following detailed description refers to the accompanying drawings. The same reference numbers in different drawings may identify the same or similar elements.

Information may be shared between various entities, such as different tools, software applications, devices, etc. Unfortunately, in many instances, the format of the information is initially incompatible with a format utilized by a receiving entity. In such cases, to use the information, it may be necessary to reformat or convert the information into the format that is utilized by the receiving entity.

Overview

Systems and/or methods described herein may provide a text import tool that enables information to be imported to or converted for use in a computing environment, such as a technical computing environment (TCE). The text import tool may define imported data types for the information and may parse the information into the defined data types.

Figure 1:
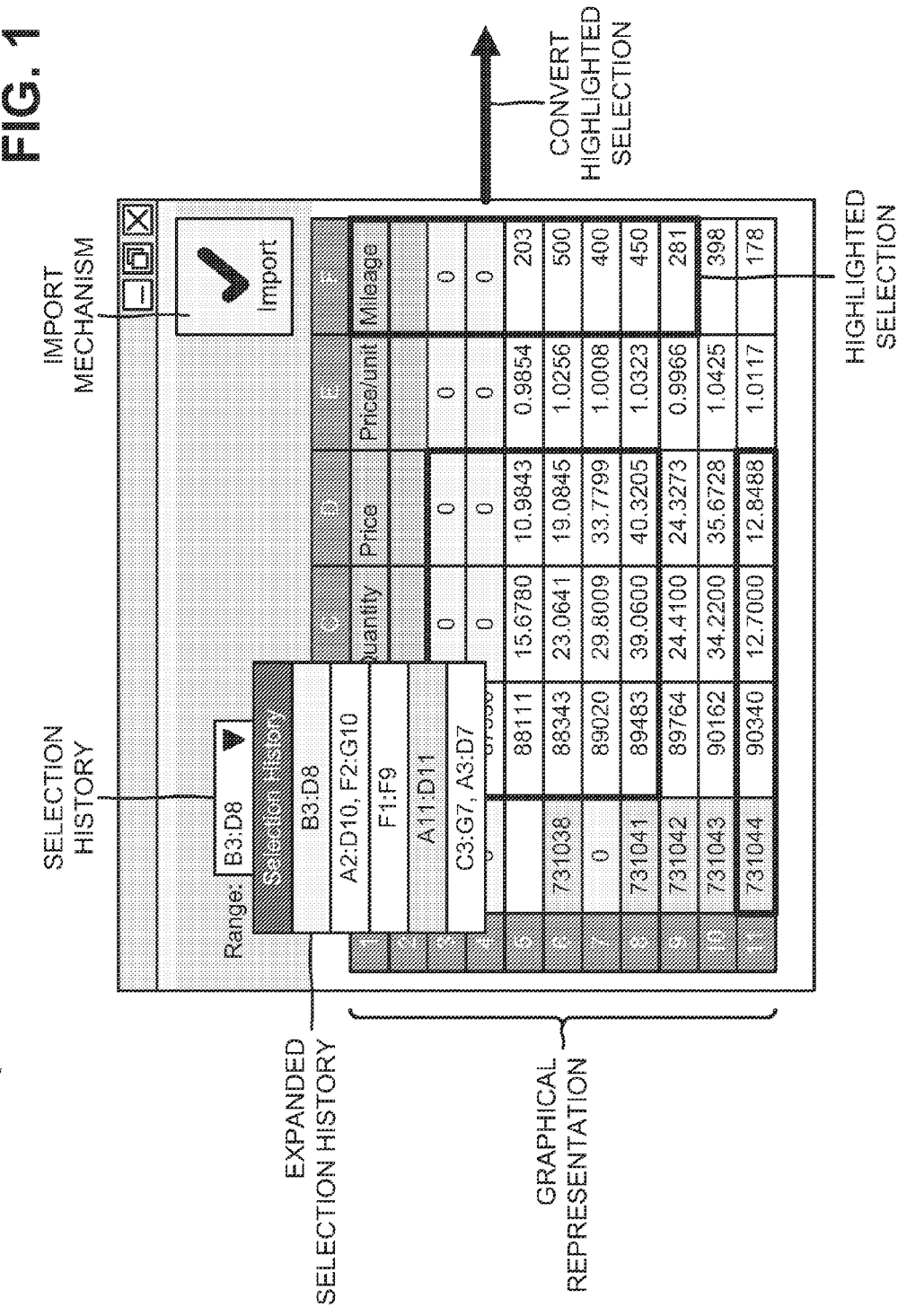
FIG. 1 is a diagram of an overview of an example implementation described herein.

FIG. 1 is a diagram of an overview of an example implementation described herein. A text file may include data values and may be parsed, by a device (not shown in FIG. 1), to identify data types (e.g., numbers, text, etc.) associated with the data values. A graphical representation of the text file may be generated by the device based on the data values and/or the data types. In some implementations, the graphical representation may include a preview of how the text will be modified for importing into a computing environment, such as a TCE. For example, as shown in FIG. 1, the graphical representation may include data cells that correspond to the data values of the text file.

The graphical representation may be presented, via the device, to a user, and the user may select one or more of the data cells. For example, assume the user selects the data cells associated with column B, row "3" (e.g., B3) through column D, row "8" (e.g., D8) of the graphical representation. At some other time, assume the user selects the data cells associated with column A, row "11" (e.g., A11) through column D, row "11" (e.g., D11) of the graphical representation. Also, assume the user selects the data cells associated with column F, row "1" (e.g., F1) through column F, row "9" (e.g., F9) of the graphical representation. The selections by the user may be stored in a selection history, and may be viewed by the user via an expanded selection history (e.g., a drop-down menu). The user may point to or select a range of data cells in the expanded selection history, and the selected range of data cells may be highlighted, via the device, in the graphical representation. When the user selects a range of data cells in the expanded selection history, the selected range may become the current selection.

An import mechanism (e.g., a button, an icon, a link, etc.) may be provided that, when selected, may instruct the device to import the highlighted, selected range of data cell(s) to the TCE. If the user selects the import mechanism, the device may identify data types associated with the selected range of data cell(s), and may convert the selected data cell(s) into data containers that may be imported to the TCE. The data containers may be in formats that are understood by the TCE. In some implementations, the device may infer default column data types when the text import tool is opened and/or when the user changes a selected data container.

Such an arrangement may enable a user to view a selection history associated with a text file, prior to converting the text file into a TCE format. A current selection in the selection history may be automatically converted into a format that may be utilized by a TCE. The converted selection may be previewed and manipulated by a user prior to importing the converted information to the TCE.

The terms code and program code, as used herein, are to be used interchangeably and are to be broadly interpreted to include text-based code that may require further processing to execute (e.g., C++ code, Hardware Description Language (HDL) code, very-high-speed integrated circuits (VHSIC) HDL (VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In some implementations, code may include different combinations of the above-identified classes (e.g., text-based code, binary code, text files, etc.). Alternatively, or additionally, code may include a dynamically-typed programming language (e.g., the M language, a MATLAB® language, a MATLAB-compatible language, a MATLAB-like language, etc.) that can be used to express problems and/or solutions in mathematical notations. Alternatively, or additionally, code may be of any type, such as function, script, object, etc., and a portion of code may include one or more characters, lines, etc. of the code.

User interfaces, as described herein, may include graphical user interfaces (GUIs) or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of the TCE (e.g., via a touch screen display, a mouse, a keyboard, a keypad, voice commands, etc.).

Example Environment Arrangement

FIG. 2 is a diagram of an example environment 200 in which systems and/or methods described herein may be implemented. As illustrated, environment 200 may include a client device 210 interconnected with a server device 220 via a network 230. Components of environment 200 may interconnect via wired and/or wireless connections.

Client device 210 may include one or more devices that are capable of communicating with server device 220 via network 230. For example, client device 210 may include a laptop computer, a personal computer, a tablet computer, a desktop computer, a workstation computer, a smart phone, a personal digital assistant (PDA), and/or other computation and communication devices.

Server device 220 may include one or more server devices, or other types of computation and communication devices. Server device 220 may include a device that is capable of communicating with client device 210 (e.g., via network 230). In some implementations, server device 220 may include one or more laptop computers, personal computers, workstation computers, servers, central processing units (CPUs), graphical processing units (GPUs), application-specific integrated circuits (ASICs), field-programmable gate arrays (FPGAs), etc. In some implementations, server device 220 may include TCE 240 and may perform some or all of the functionality described herein for client device 210. Alternatively, server device 220 may be omitted and client device 210 may perform all of the functionality described herein for client device 210.

Network 230 may include a network, such as a local area network (LAN), a wide area network (WAN), a metropolitan area network (MAN), a telephone network, such as the Public Switched Telephone Network (PSTN) or a cellular network, an intranet, the Internet, or a combination of networks.

TCE 240 may be provided within a computer-readable medium of client device 210. Alternatively, or additionally, TCE 240 may be provided in another device (e.g., server device 220) that is accessible by client device 210. TCE 240 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 240 may include a dynamically-typed programming language (e.g., the M language, a MATLAB® language, a MATLAB-compatible language, a MATLAB-like language, etc.) that can be used to express problems and/or solutions in mathematical notations.

For example, TCE 240 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 240 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 240 may further provide mathematical functions and/or graphical tools (e.g., for creating plots, surfaces, images, volumetric representations, etc.). In some implementations, TCE 240 may provide these functions and/or tools using toolboxes (e.g., toolboxes for signal processing, image processing, data plotting, parallel processing, etc.). In some implementations, TCE 240 may provide these functions as block sets or in another way, such as via a library, etc.

TCE 240 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 240 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3]

Now suppose the program is executed, for example, in a TCE, such as TCE 240. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 240 may provide mathematical routines and a high-level programming language suitable for non-professional programmers and may provide graphical tools that may be used for creating plots, surfaces, images, volumetric representations, or other representations. TCE 240 may provide these routines and/or tools using toolboxes (e.g., toolboxes for signal processing, image processing, data plotting, parallel processing, etc.). TCE 240 may also provide these routines in other ways, such as, for example, via a library, local or remote database (e.g., a database operating in a computing cloud), remote procedure calls (RPCs), and/or an application programming interface (API). TCE 240 may be configured to improve runtime performance when performing computing operations. For example, TCE 240 may include a just-in-time (JIT) compiler.

Although FIG. 2 shows example components of environment 200, in some implementations, environment 200 may include fewer components, different components, differently arranged components, or additional components than those depicted in FIG. 2. Alternatively, or additionally, one or more components of environment 200 may perform one or more tasks described as being performed by one or more other components of environment 200.

Example Device Architecture

FIG. 3 is an example diagram of a device 300 that may correspond to one or more of the devices of environment 200.

As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. Alternatively, or additionally, one or more components of device 300 may perform one or more tasks described as being performed by one or more other components of device 300.

Example Process for Using a Text Import Tool

Figure 4B:
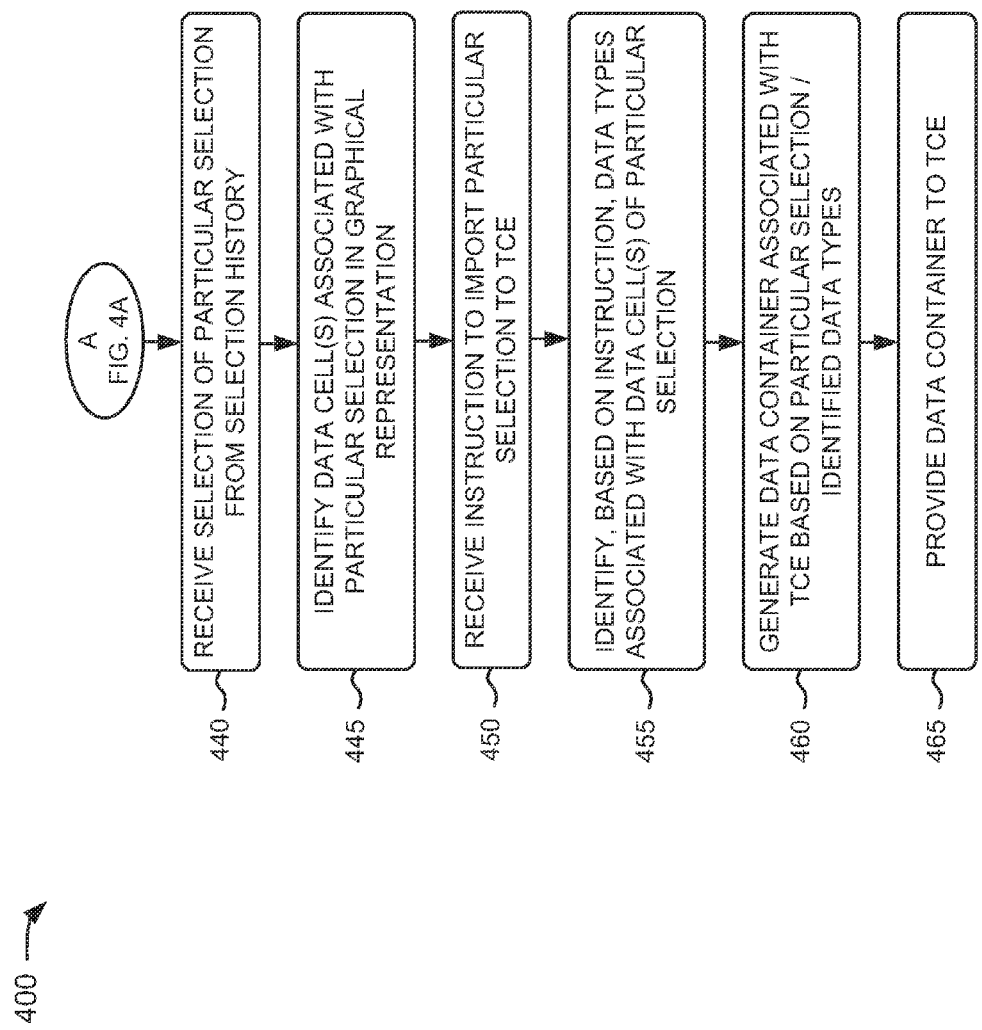

FIGS. 4A and 4B are flow charts of an example process 400 for using a text import tool. In some implementations, process 400 may be performed by client device 210 and/or server device 220. In some implementations, process 400 may be performed by another device or a group of devices separate from or including client device 210 and/or server 220. Process 400 will be described with reference to FIGS. 5-19.

As shown in FIG. 4A, process 400 may include receiving text that includes data values (block 405), and parsing the text to identify data types associated with the data values (block

Figure 5:
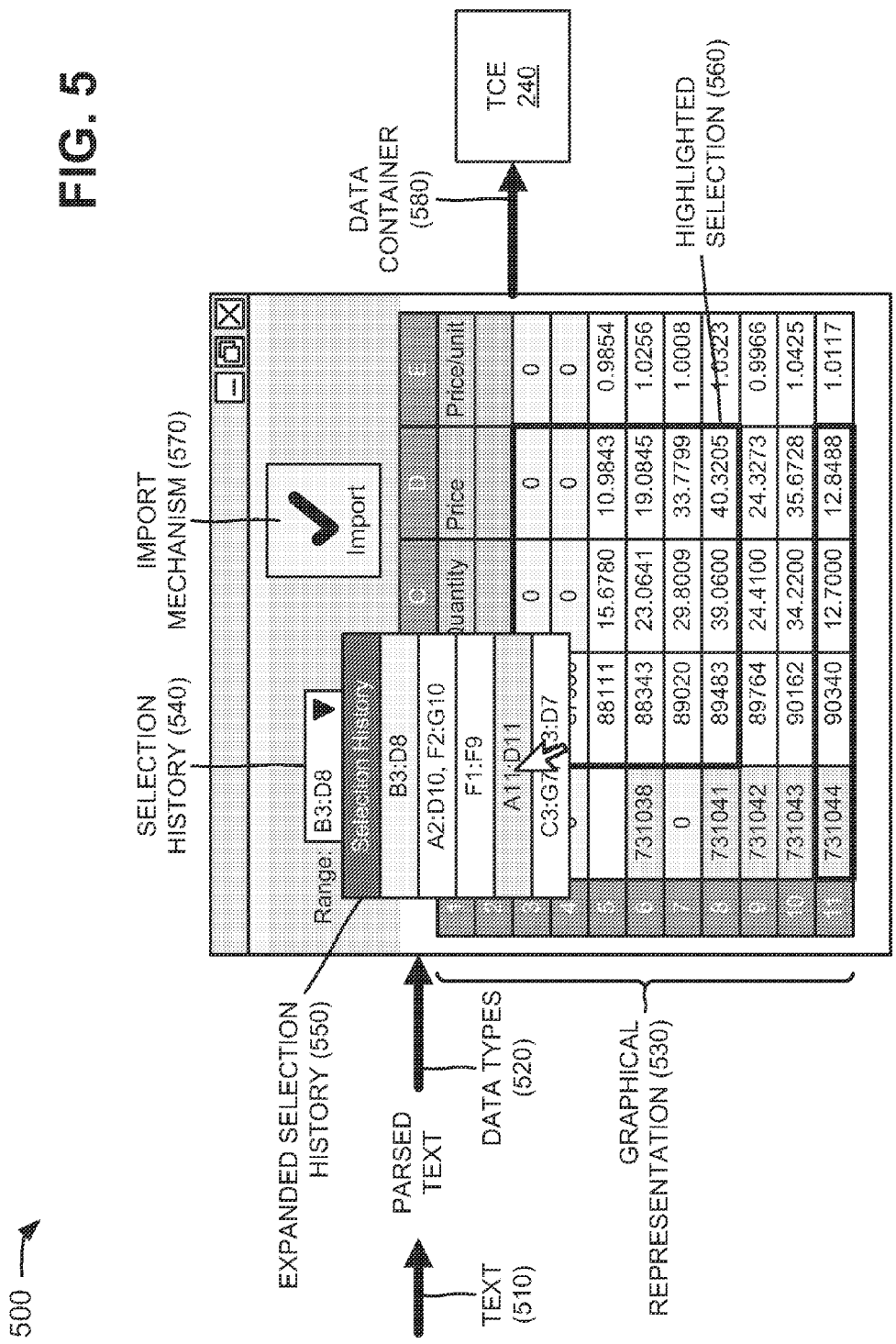
FIG. 5 is a diagram of example operations for using a text import tool to create a graphical representation for a text file and to import a selected portion of the text file into a TCE.

410). FIG. 5 is a diagram of example operations 500 for using a text import tool to create a graphical representation for a text file and to import a selected portion of the text file into TCE 240. The text import tool may be provided in client device 210 and/or server device 220. As shown in FIG. 5, the text import tool may receive a text file 510 that includes data values separated by delimiters or spaced into fixed-width columns. In some implementations, the text import tool may receive text file 510 from server device 220, may retrieve text file 510 from memory (e.g., main memory 330, FIG. 3), may receive text file 510 from a user of client device 210/TCE 240 (e.g., via user inputs), etc.

The text import tool may parse text file 510 to identify data types 520 associated with the data values of text file 510. Data types 520 may include, for example, numeric, characters, strings, dates, structures, cell arrays, function handles, map containers, time series, etc. In some implementations, the text import tool may identify data types 520 of text file 510 based on the content of text file 510. For example, the text import tool may determine that a column of text file 510 has a data type of a number if all or a particular amount of the content in the column includes a sequence of numeric strings preceded by identical non-numeric prefixes and followed by identical non-numeric suffixes. In some implementations, the text import tool may determine that a column of text file 510 has a data type of a date/time if all or a particular amount of information in the column can be parsed to serial date numbers (e.g., if the data is of a particular format, such as month/day/year, month day, year, etc.) using a function (e.g., a datenum function) for one of a fixed set of date/time formats. In some implementations, the text import tool may ignore information provided in a header row (e.g., a row showing "Quantity," "Price," etc.) when identifying data types 520 in text file 510. The text import tool may identify a header row of text file 510 as a first row spanning all columns of text file 510, where all data values begin with an alphabetical character.

As further shown in FIG. 4A, process 400 may include generating a graphical representation of the text file that includes data cells corresponding to the data values, based on the data values and/or the data types (block 430), and providing the graphical representation for display (block 440). For example, as shown in FIG. 5, the text import tool may utilize the data values of text file 510 and/or the identified data types 520 to generate a graphical representation 530 of text file 510. As shown, graphical representation 530 may include data cells arranged in a spreadsheet format (e.g., columns and rows). The data cells may correspond to the data values of text file 510. The text import tool may provide graphical representation 530 for display to a user of the text import tool. In some implementations, the text import tool may provide a row in graphical representation 530 (not shown in FIG. 5) that provides data types 520 identified for the columns of text file 510. FIG. 7, described below, provides an example of a row depicting data types 520.

Returning to FIG. 4A, process 400 may include receiving selections of data cell(s) in the graphical representation (block 425), storing the selections as a selection history (block 430), and providing the selection history for display (block 435). For example, as shown in FIG. 5, the user of the text import tool may select one or more data cells of graphical representation 530 using a mouse or other pointing device, using a keyboard, using voice commands, etc. The text import tool may store the selections in a particular form, such as a spreadsheet index form (e.g., "A12:B23"). The text import tool may display a selection history mechanism 540 (e.g., a menu, a drop-down menu, etc.) that displays a currently selected portion of graphical representation 530 (e.g., data cells B3:D8). When selection history mechanism 540 is selected by the user, the text import tool may display an expanded selection history menu 550. Expanded selection history menu 550 may display the currently selected portion of graphical representation 530 and previously selected portions of graphical representation 530 (e.g., data cells A2:D10, F2:G10, F1:F9, etc.).

As shown in FIG. 4B, process 400 may include receiving selection of a particular selection from the selection history (block 440), and identifying data cell(s) associated with the particular selection in the graphical representation (block 445). For example, as shown in FIG. 5, the user of the text import tool may select or hover over (e.g., with a mouse cursor) one or more selections of expanded selection history 550, and the text import tool may identify (e.g., highlight, shade, etc.) the one or more selections in graphical representation 530. If the user selects or hovers over A11:D11 in expanded selection history 550, the text import tool may highlight data cells A11:D11 in graphical representation 530. As another example, if the user selects or hovers over B3:D8 in expanded selection history 550, the text import tool may highlight data cells B3:D8 in graphical representation 530, as indicated by reference number 560.

As further shown in FIG. 4B, process 400 may include receiving an instruction to import the particular selection to a TCE (block 450), and identifying, based on the instruction, data types associated with the data cell(s) of the particular selection (block 455). For example, as shown in FIG. 5, after the user selects a particular selection (e.g., highlighted selection 560) from expanded selection history 550, the text import tool may receive an instruction, from the user, to import the particular selection to TCE 240. In some implementations, the user may provide the instruction to the text import tool via a voice command, via a command(s) provided at a command prompt of the text import tool, etc. In some implementations, text import tool may provide an import mechanism 570 (e.g., a button, an icon, a link, etc.) that, when selected by the user, provides the instruction to the text import tool. In some implementations, the text import tool may infer default column data types when the text import tool is opened and/or when the user changes a selected data container.

Based on the instruction, the text import tool may identify data type(s) 520 (e.g., text, numbers, etc.) associated with the data cells provided in the particular selection. For example, the text import tool may determine the column(s) associated with the particular selection, and may retrieve the data type(s) previously identified for the determined column(s). For highlighted selection 560, the text import tool may determine that columns "B" through "D" are selected, and may retrieve data types 520 (e.g., numbers) previously identified for columns "B" through "D."

Returning to FIG. 4B, process 400 may include generating a data container associated with the TCE based on the particular selection and the identified data types (block 460), and providing the data container to the TCE (block 465). For example, as shown in FIG. 5, the text import tool may generate a data container 580 (e.g., a matrix, a cell array, etc.) based on the identified data types associated with the data cells provided in the particular selection (e.g., highlighted selection 560). In some implementations, the text import tool may select a particular type of data container 580 that can store the information provided in the particular selection. For example, if the particular selection includes a single column of numeric data types, the text import tool may select a vector array as data container 580 since a vector array may store numbers in a single column. If the particular selection includes multiple columns of text and number data types, the text import tool may select a heterogeneous array (e.g., a dataset array) as data container 580 since a heterogeneous array may store columns of mixed data types. In some implementations, the user may select data container 580 from a user interface combination window. If there is a mismatch between data types of the selection and data types of data container 580, the text import tool may implement unimportable data rules.

Data container 580 may include the information of the particular selection (e.g., highlighted selection 560), and may be in a format that is understood by TCE 240 (e.g., a matrix, a cell array, a vector, a table, a dataset array, etc.). The text import tool may provide data container 580 to TCE 240, and TCE 240 may receive data container 580.

Figure 6:
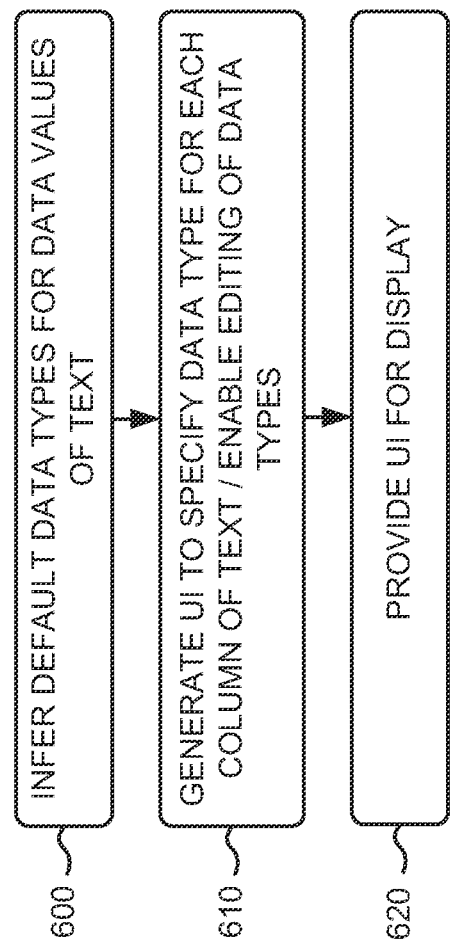
FIG. 6 is a flow chart of a portion of the example process of FIGS. 4A and 4B.

Process blocks 410-420 may include the process blocks depicted in FIG. 6. As shown in FIG. 6, process blocks 410-420 may include inferring default data types for the data values of the text (block 600), generating a UI to specify a data type for each column of the text and to enable editing of the data types (block 610), and providing the UI for display (block 620). FIG. 7 is a diagram of example operations 700 for inferring default data types for data values of a text file and for enabling the data types to be edited. With reference to FIG. 7, the text import tool may determine default column data types for text file 510 (FIG. 5) based on the content of the columns and using heuristics. For example, the text import tool may determine that a column of text file 510 has a default data type of a number if all of the content in the column (e.g., excluding a header) includes a sequence of numeric strings preceded by identical non-numeric prefixes and followed by identical non-numeric suffixes. In some implementations, the text import tool may determine that regular expressions are used to identify numbers with a comma decimal separator and/or a period thousand separator for European numeric formats. In some implementations, the text import tool may determine that a column of text file 510 has a default data type of a date/time if information in the column includes data of a particular format, such as month/day/year, month day, year, etc.

The text import tool may parse column text into the determined data type. When parsing text to numbers, the text import tool may utilize expressions to remove optional non-numeric prefixes and suffixes, and may scan any remaining numeric content. When parsing text to dates/times, the text import may convert text to dates by using a function, such as a datenum function.

After parsing text file 510 into the determined data types, the text import tool may generate a user interface for displaying data types 710 associated with each column of text file 510. As an example, assume that, based on parsing text file 510, the text import tool generates a user interface in which a first column (e.g., column A) of text file 510 is associated with a number data type, the second column (e.g., column B) of text file 510 is associated with a text data type, etc. The user interface may enable a user to select and edit any of data types 710. The user may select one of data types 710, and the user interface may display a menu 720 that enables the user to edit the selected data type 710 (e.g., change a number data type to a text data type). For date/time data types, menu 720 may include several specific date/time formats 730 (e.g., dd-mm-yyyy, mm/dd, etc.) from which the user may select. In some implementations, the text import tool may enable the user to select the data/time and provide a custom date format. Menu 720 may include a mechanism 740 (e.g., a button, an icon, a link, etc.) that, when selected, enables the user to edit data types for multiple selected columns of text file 510 at one time, which may facilitate importing data types from text files with several columns.

Figure 8:
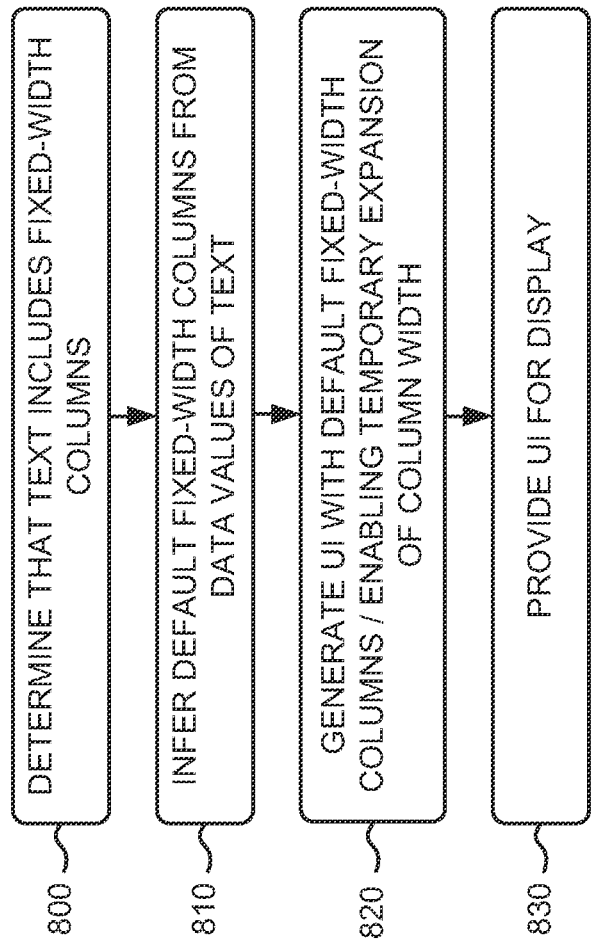
FIG. 8 is a flow chart of a portion of the example process of FIGS. 4A and 4B.

In some implementations, process blocks 410-420 may include the process blocks depicted in FIG. 8. As shown in FIG. 8, process blocks 410-420 may include determining that the text includes fixed-width columns (block 800), inferring default fixed-width columns from the data values of the text (block 810), generating a UI with the default fixed-width columns and enabling temporary expansion of a column width (block 820), and providing the UI for display (block 830).

Figure 9:
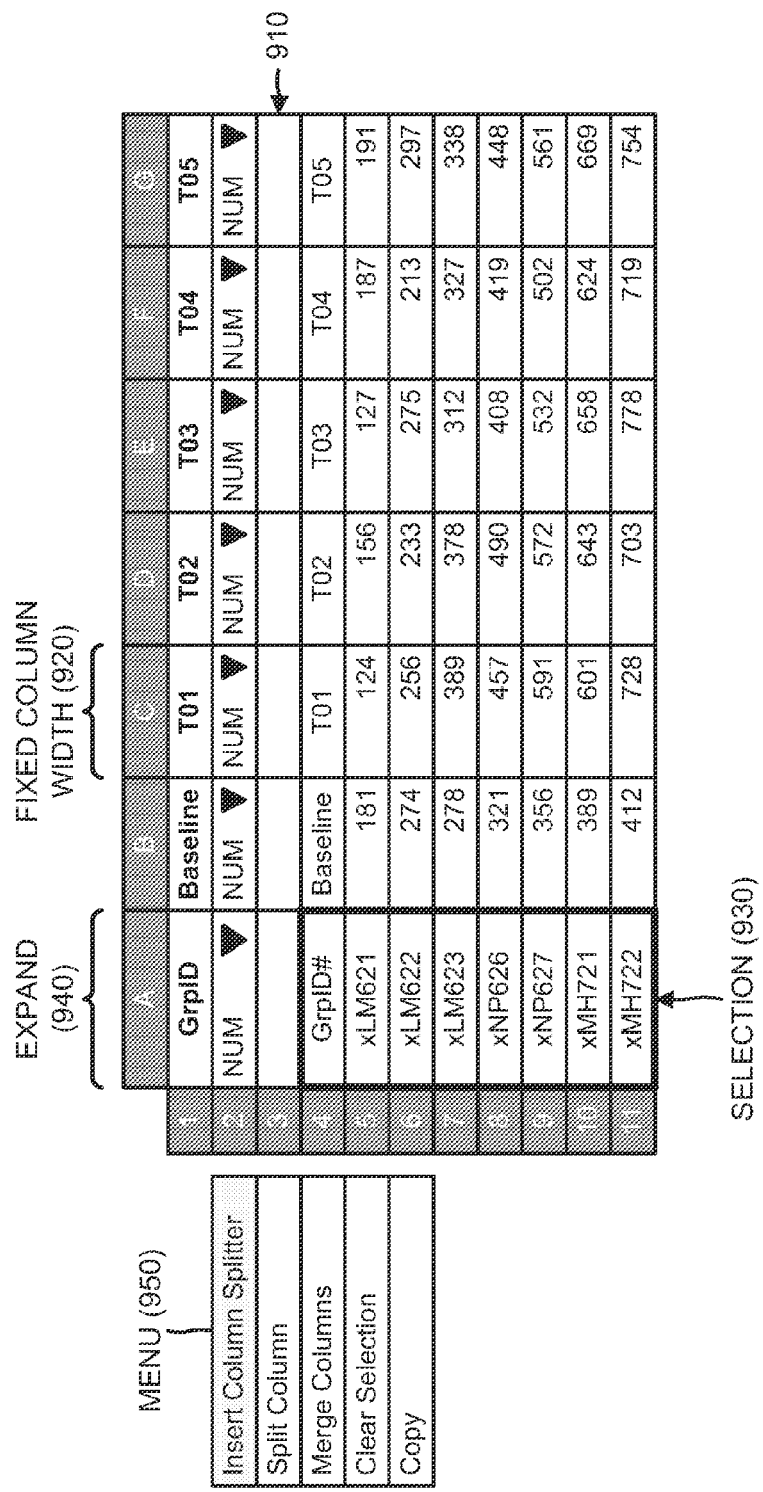
FIG. 9 is a diagram of example operations for detecting a fixed-width text file, inferring a default fixed-width column size from the text file, and temporarily expanding column widths.

FIG. 9 is a diagram of example operations 900 for detecting a fixed-width text file, determining a default fixed-width column size from the text file, and temporarily expanding column widths. Unlike existing fixed-width data import tools that separate the steps of defining a fixed-width file structure from other steps, such as defining the column data types and selecting the data to import, the text import tool may combine all of the steps together in a single user interface. This flexibility may permit a user to adjust both column positions and data types in the same user interface, and to generate desired import settings more rapidly.

When text file 510 (FIG. 5) is received, the text import tool may determine whether text file 510 has a fixed-width structure. In some implementations, the text import tool may determine that text file 510 has a fixed-width structure if most transitions from spaces to non-spaces, in text file 510, occur at predictable horizontal locations and if most lines, in text file 510, have the same length. In some implementations, the text import tool may automatically infer default fixed-width column positions from text file 510 by detecting transitions from non-space characters to space characters which are repeated in predictable locations from one line to the next. If the text import tool determines that text file 510 has a fixed-width structure, the text import tool may display a fixed-width form 910, of text file 510, by default. As further shown in FIG. 9, fixed-width form 910 of text file 510 may include fixed column widths 920 that are repeated in predictable locations of the graphical representation of text file 510.

Fixed column widths 920 may match a number of characters in each fixed-width column so that fixed-width form 910 of text file 510 reflects a layout of the fixed-width text file 510. Consequently, column headers for columns that include a small number of characters may be too narrow to accommodate headers, such as column names, data type names, etc. To enable the user to interact effectively with such columns, when a user selects a column, as indicated by reference number 930, the text import tool may temporarily expand the narrow columns, as indicated by reference number 940. This may permit fixed-width form 910 of text file 510 to reflect the fixed-width layout, while also enabling the user to interact with column headers. As further shown in FIG. 9, the text import tool may provide a context menu 950 that enables the user to merge or split fixed-width columns directly from fixed-width form 910. For example, if the user selects columns "C" and "D" and a "Merges Columns" entry from context menu 950, the text import tool may merge columns "C" and "D" together into a single column.

Figure 10:
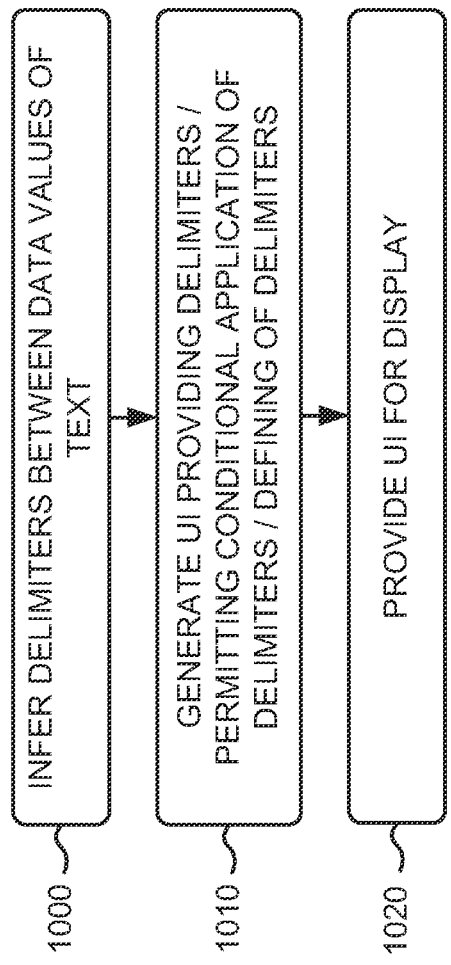
FIG. 10 is a flow chart of a portion of the example process of FIGS. 4A and 4B.

In some implementations, process blocks 410-420 may include the process blocks depicted in FIG. 10. As shown in FIG. 10, process blocks 410-420 may include inferring delimiters between the data values of the text (block 1000), generating a UI to provide the delimiters, permit conditional application of the delimiters, and define the delimiters (block 2010), and providing the UI for display (block 1020).

FIG. 11 is a diagram of example operations 1100 for inferring delimiters for a text file, allowing delimiters to be conditionally applied, and allowing custom delimiters to be defined. Unlike existing data import tools that permit only a single user-defined delimiter, the text import tool may permit a variety of delimiters to be applied and may provide selective criteria for application of delimiters. In some implementations, the text import tool may analyze and determine likely delimiters from the content of text file 510 (FIG. 5) by locating repeated non-alphanumeric phrases on consecutive lines of text file 510. The delimiters may include tabs, commas, spaces, semicolons, etc. provided between the data values of text file 510.

The text import tool may provide a mechanism 1110 (e.g., a menu, a drop-down menu, etc.) that enables the user to view the determined delimiters from text file 510. If the user selects mechanism 1110, the text import tool may provide an expanded menu 1120 that may include a list of standard delimiters (e.g., tabs, commas, spaces, semicolons, etc.), suggested delimiters 1130, custom delimiters 1140 defined by the user, etc. The standard delimiters determined to be in text file 510 may be identified by the text import tool. For example, the text import tool may check (e.g., in a checkbox) the standard delimiters determined to be in text file 510. Suggested delimiters 1130 may include delimiters suggested by the text import tool based on the analysis of text file 510. For example, if the text import tool detects a specific character(s) (e.g., "*") in text file 510 that may be a delimiter, the text import tool may provide the specific character(s) in suggested delimiters 1130. Custom delimiters 1140 may enable the user to define a custom delimiter (e.g., "@~@") that may be utilized by the text import to analyze text file 510 and parse columns of text file 510. Expanded menu 1120 may present the user with a relevant set of choices for delimiters, which may reduce the need for the user to type complex text.

The text import tool may enable the user to select one or more delimiters in expanded menu 1120 that are to be applied to text file 510. The text import tool may utilize the applied delimiters to analyze text file 510 and parse columns of text file 510. Expanded menu 1120 may substitute words (e.g., "Tab," "Space," etc.) for difficult to recognize delimiters. The text import tool may enable the user to define delimiters which separate rows of data, as well as columns, of text file 510. The text import tool may permit delimiters to be conditionally applied in order to conditionally parse columns of text file 510. For example, the text import tool may apply a selected delimiter only if the selected delimiter does not appear within quotes or parentheses in text file 510.

Figure 12:
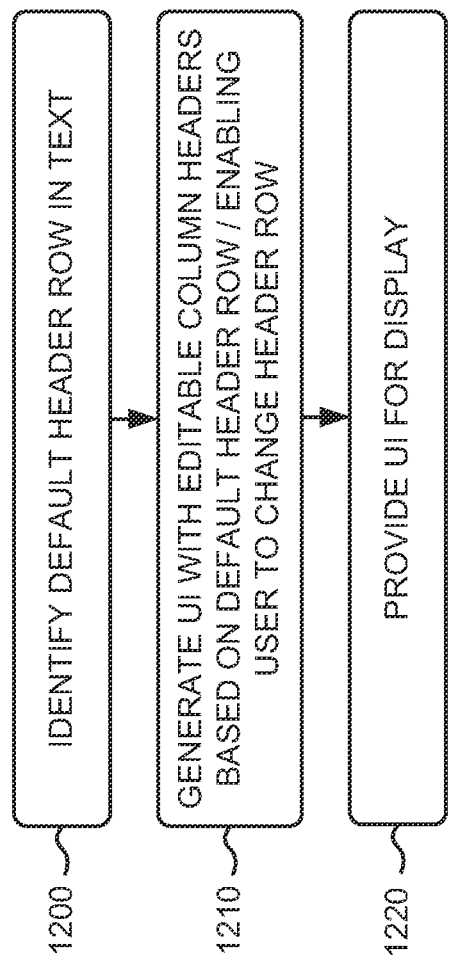
FIG. 12 is a flow chart of a portion of the example process of FIGS. 4A and 4B.

In some implementations, process blocks 410-420 may include the process blocks depicted in FIG. 12. As shown in FIG. 12, process blocks 410-420 may include identifying a default header row in the text (block 1200), generating a UI with editable column headers, based on the default header row, and enabling the user to change the header row (block 1210), and providing the UI for display (block 1220).

FIG. 13 is a diagram of example operations 1300 for defining a header row selector for a text file, selecting a default header row for the text file, and displaying editable names from the header row. Text files may be structured with one or more lines of column descriptions (or headers) followed by one or more blocks of numeric data arranged in columns that correspond to the headers. A user may want to import data from such text files into column variables whose names are derived from the headers. The text import tool may permit the user to define a header row which is used to derive imported column variable names.

The text import tool may identify a first row spanning all columns, of text file 510 (FIG. 5), where all data cells begin with an alphabetical character, as a header for text file 510. The text import tool may automatically select the identified header as a default header row 1310 for text file 510. For example, the text import tool may select row "4" of text file 510 as default header row 1310 since the data cells of row "4" include alphabetical characters. The text import tool may display the characters of default header row 1310 in a separate row (e.g., in row "1"), and may enable the user to edit the text of the separate row (e.g., to override names derived from text file 510), as indicated by reference number 1320. The text import tool may provide a header row selector 1330 from which a user may select a header row of text file 510. For example, the user may utilize header row selector 1330 to select a different header row than default header row 1310. In some implementations, default header row 1310 or the user-selected header row may be highlighted by the text import tool. In some implementations, header names may be included in column headers so that the header names may remain visible as the user scrolls through the graphical representation.

Figure 14:
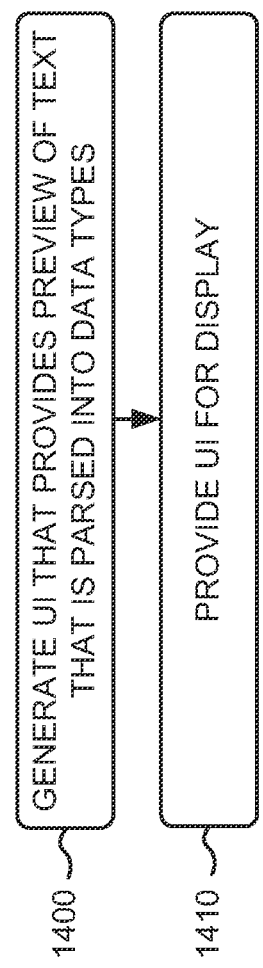
FIG. 14 is a flow chart of a portion of the example process of FIGS. 4A and 4B.

In some implementations, process blocks 415/420 may include the process blocks depicted in FIG. 14. As shown in FIG. 14, process blocks 415/420 may include generating a UI that provides a preview of text that is parsed into data types (block 1400), and providing the UI for display (block 1410).

FIG. 15 is a diagram of example operations 1500 for explaining how text is parsed and for overlaying the converted text over original text. The text import tool may parse the data values of text file 510 into data types, as described above. If the user hovers over or selects (e.g., via a mouse cursor) a data cell of the parsed text file 510 (e.g., graphical representation 530, FIG. 5), the text import tool may provide visual effects that convey how content of the data cell is parsed into a data type. For example, if the user hovers over or selects data cell D4, the text import tool may provide a mechanism (e.g., a tooltip window 1510) that indicates how content of data cell D4 is parsed into a data type and a parsed value. As shown in FIG. 15, tooltip window 1510 may state that the date (e.g., Mar. 1, 2009) in data cell D4 is converted to a date/time data type and a parsed value of "733833." The text import tool may overlay text on a selected data cell to indicate a converted value of the data cell after it has been parsed to the data type. As shown in FIG. 15, the text import tool may display a converted value 1520 (e.g., "733833") over the original date (e.g., Mar. 1, 2009) in data cell D4.

Figure 16:
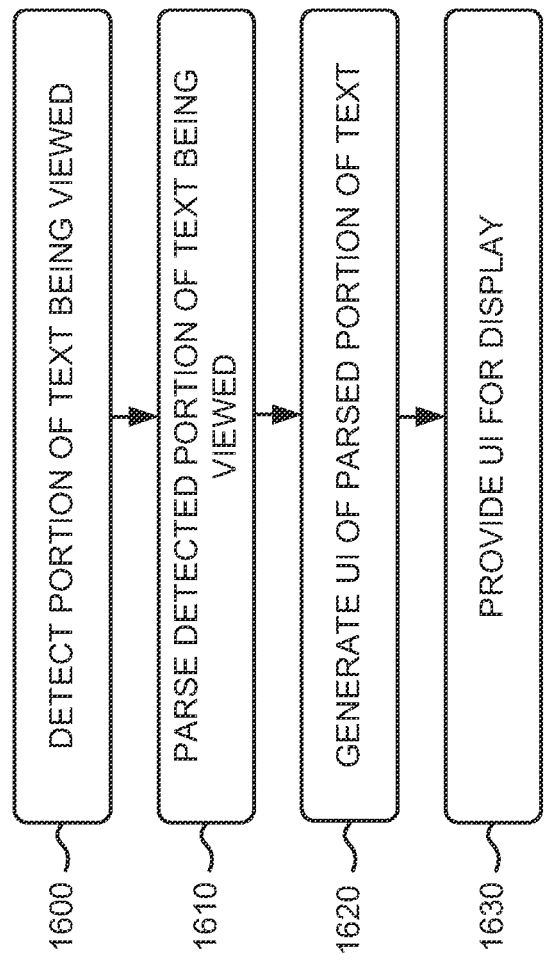
FIG. 16 is a flow chart of a portion of the example process of FIGS. 4A and 4B.

In some implementations, process blocks 410-420 may include the process blocks depicted in FIG. 16. As shown in FIG. 16, process blocks 410-420 may include detecting a portion of the text being viewed (block 1600), parsing the detected portion of the text being viewed (block 1610), generating a UI of the parsed portion of the text (block 1620), and providing the UI for display (block 1630).

Figure 17:
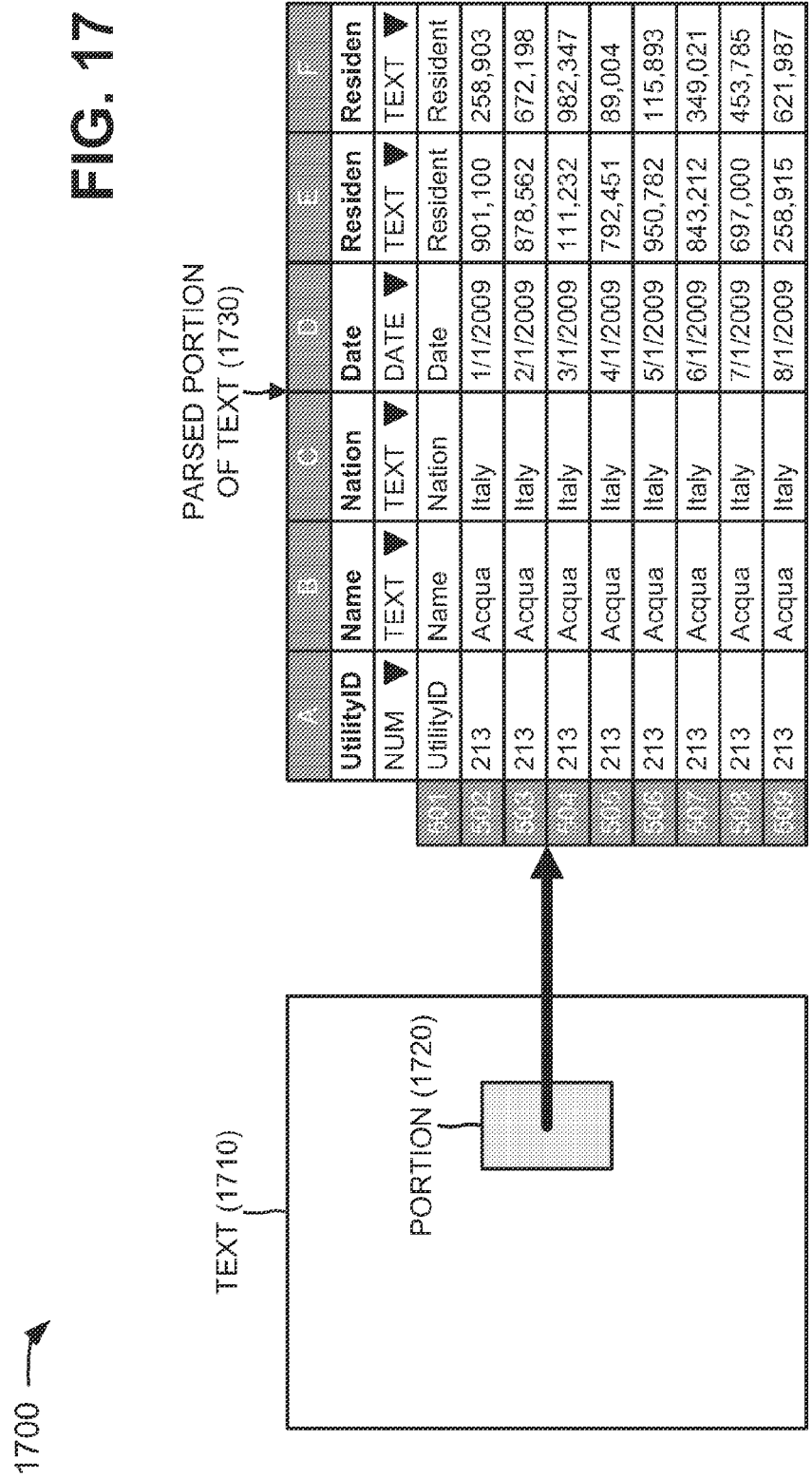
FIG. 17 is a diagram of example operations for parsing a portion of a text file.

FIG. 17 is a diagram of example operations 1700 for parsing a portion of a text file. In some cases, text files can be so large that contents of the entire parsed text file will not fit within a working memory. Even in cases where sufficient memory is available, parsing the entire content of a large text file before displaying a preview of the text file may cause an application to operate very slowly. The text import tool may prevent this by reading and parsing only rows and columns for a portion of a text file preview that is currently being displayed by the text import tool. The text import tool may provide the entire text file preview for display (e.g., in a spreadsheet), but only a portion of the text file preview may fit in a viewing pane due to size constraints of a display device. The text import tool may provide scroll bars to enable a user to scroll horizontally and vertically so that the entire contents of the text file preview may be viewed by the user. The portion of the text file preview provided in the viewing pane may be read and parsed by the text import tool. If the user the scrolls vertically or horizontally to view other portions of the text file preview, the corresponding other portions of the text file may be read and parsed on the fly so that the computationally-intensive parsing may be performed only as needed.

As shown in FIG. 17, the text import tool may be utilizing a large text file 1710, but may only be displaying a portion 1720 of large text file 1710 in a viewing pane. The text import tool may detect portion 1710 of large text file 1710 being displayed, and may parse the detected portion 1720 of text file 1710. The text import tool may display the parsed portion 1720 of text file 1710, as indicated by reference number 1730.

Figure 18:
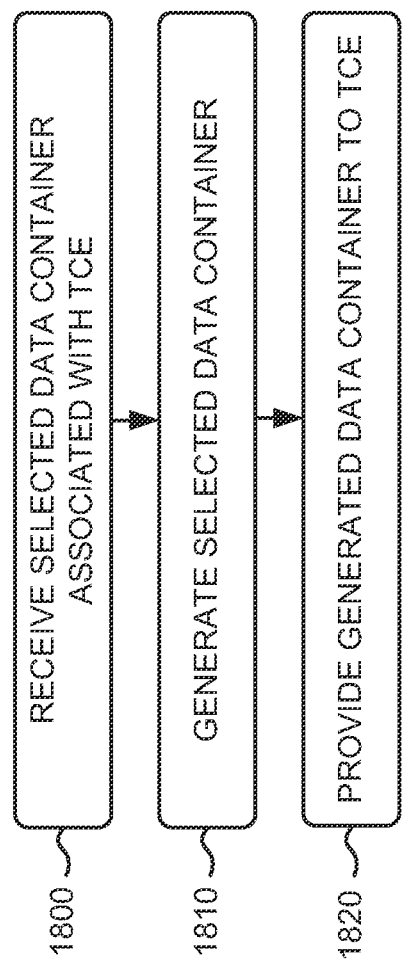
FIG. 18 is a flow chart of a portion of the example process of FIGS. 4A and 4B.

Process block 465 may include the process blocks depicted in FIG. 18. As shown in FIG. 18, process block 465 may include receiving a selected data container associated with the TCE (block 1800), generating the selected data container (block 1810), and providing the generated data container to the TCE (block 1820).

Figure 19:
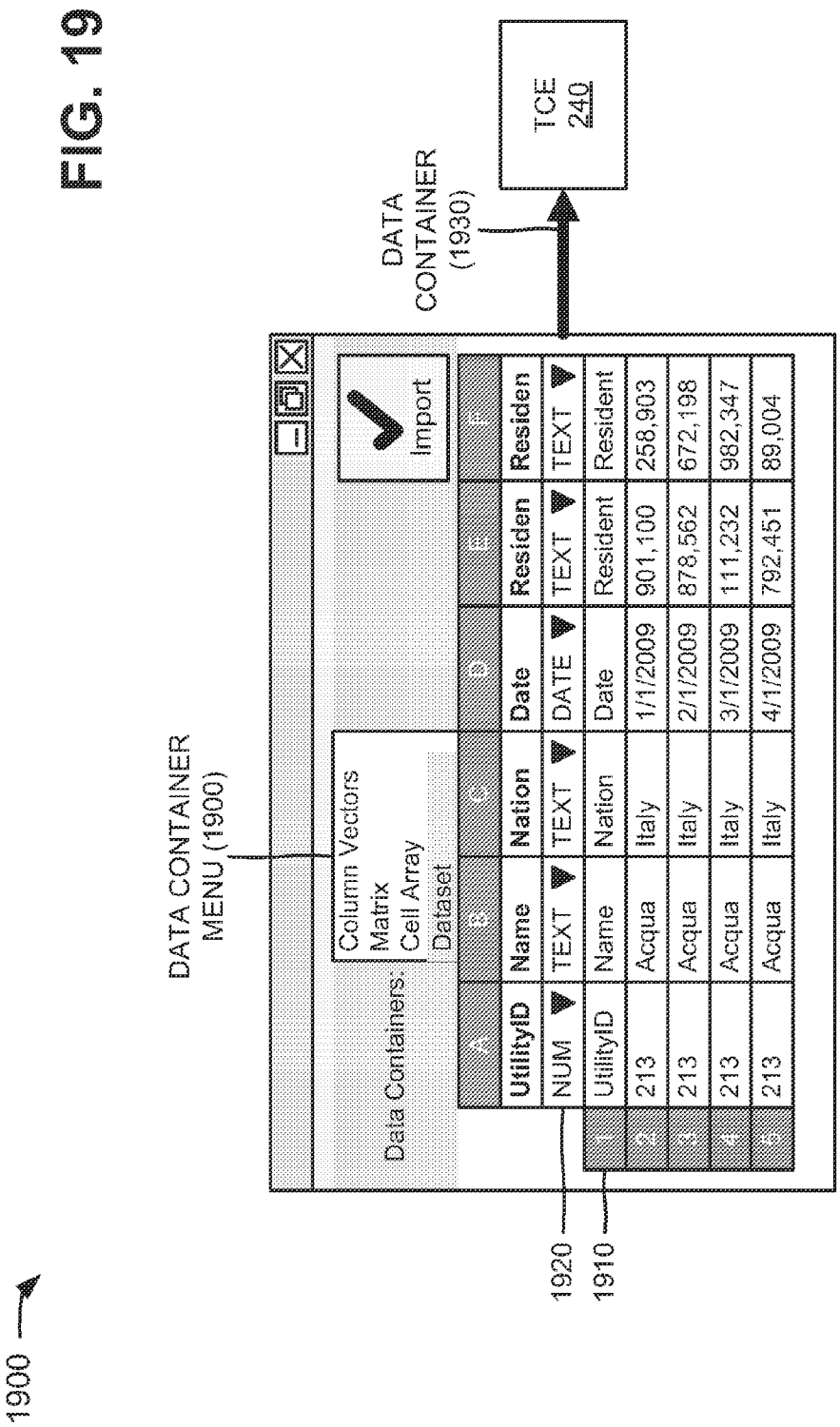
FIG. 19 is a diagram of example operations for importing a text file.

FIG. 19 is a diagram of example operations for importing a text file. The text import tool may permit text file 510 (FIG. 5) to be imported into a variety of data containers, such as vectors, matrices, dataset arrays, etc. The text import tool may provide a menu 1900 of data containers that may be used to import text file 510 into TCE 240. For example, menu 1900 may list data containers, such as column vectors, a matrix, a cell array, a dataset array, etc., that may be used to import text file 510 into TCE 240. The text import tool may derive the properties of the data containers, as well as the data contained in the data containers, from the content of text file 510. For example, data container variable names may be derived from data in a header row 1910 of text file 510, and data container variable classes may be derived from column data types 1920. The user may select a data container from menu 1900, and the text import tool may generate the selected data container and populate the selected data container with information from text file 510. The text import tool may provide the selected data container to TCE 240, as indicated by reference number 1930.

In some implementations, if the user selects a data container from menu 1900 that is not appropriate for the information provided in text file 510, the text import tool may prevent the selected data container from being used. In such situations, the text import tool may generate an error message indicating that the selected data container is improper, and may recommend one or more other data containers that may be appropriate for text file 510. For example, if the text file 510 includes multiple columns and the user selects a vector array as the data container from menu 1900, the text import tool may generate the error message since a vector array may only store numbers in a single column. In some implementations, if text file 510 includes multiple columns and the user selects "Column Vectors" as data container 1930, the text import tool may import the selected data to the column vectors without error. If there is a data type mismatch, such as when one or more of the selected columns has a type "text" and data container 1930 may only include numeric content (e.g., is a matrix), the text import tool may apply the unimportable data rules to resolve the incompatibility but may not generate an error.

Although FIGS. 4A-19 a show example operations capable of being performed by client device 210 and/or server device 220, in some implementations, client device 210 and/or server device 220 may perform fewer operations, different operations, or additional operations than depicted in FIGS. 4A-19. In some implementations, one or more operations, described above, may be performed in parallel.

CONCLUSION

Systems and/or methods described herein may provide a text import tool that enables information to be imported to or converted for use in a computing environment, such as a TCE. The text import tool may define imported data types for the information and may parse the information into the defined data types.

The foregoing description of implementations provides illustration and description, but is not intended to be exhaustive or to limit the implementations to the precise form disclosed. Modifications and variations are possible in light of the above teachings or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an ASIC, or a FPGA, or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
 receiving text that includes data values,
  the receiving the text being performed by a device;
 parsing the text to identify data types associated with the data values,
  the parsing the text being performed by the device;
 generating, based on the data values and the data types, a graphical representation of the text that includes data cells corresponding to the data values,
  the generating the graphical representation being performed by the device;
 providing the graphical representation for display,
  the providing the graphical representation for display being performed by the device;
 receiving one or more selections of one or more data cells in the graphical representation,
  the receiving the one or more selections being performed by the device;
 storing the one or more selections in a selection history,
  the selection history storing a plurality of selections, the plurality of selections including the one or more selections and one or more other selections received prior to receiving the one or more selections, and
the storing the one or more selections being performed by the device;
providing the selection history for display,
the providing the selection history for display being performed by the device;
receiving a selection of a particular selection, of the plurality of selections, from the selection history,
the receiving the selection being performed by the device;
identifying one or more data cells associated with the particular selection in the graphical representation,
the identifying the one or more data cells being performed by the device;
receiving an instruction to import the particular selection to a technical computing environment,
the receiving the instruction being performed by the device;
highlighting, based on the instruction, only the one or more data cells, associated with the particular selection, in the graphical representation,
the one or more data cells being associated with the data types, and
the highlighting only the one or more data cells being performed by the device;
generating a data container associated with the technical computing environment, based on the particular selection and the data types associated with the one or more data cells of the particular selection,
the generating the data container being performed by the device; and
providing the data container to the technical computing environment,
the providing the data container being performed by the device.

2. The method of claim 1, where the data container is selected by a user from a list of data containers associated with the technical computing environment.

3. The method of claim 2, further comprising:
generating a user interface that specifies data types for columns of the text and that permits editing of the specified data types; and
providing the user interface for display.

4. The method of claim 1, where parsing the text to identify the data types comprises:
determining default data types for the data values of the text.

5. The method of claim 1, further comprising:
determining that the text includes fixed-width columns;
selecting default fixed-width columns based on the fixed-width columns;
generating a user interface that includes the default fixed-width columns and that permits temporary expansion of the default fixed-width columns; and
providing the user interface for display.

6. The method of claim 1, further comprising:
determining delimiters provided between the data values of the text;
generating a user interface that identifies the delimiters;
providing the user interface for display;
detecting selection of one or more delimiters, of the delimiters identified in the user interface; and
conditionally applying the selected one or more delimiters to the text.

7. The method of claim 1, further comprising:
identifying a default header row in the text;
generating a user interface that includes column headers based on the default header row;
providing the user interface for display;
receiving an edit to a particular column header of the column headers; and
changing the particular column header based on the edit.

8. The method of claim 1, further comprising:
generating a user interface that explains how a data value is parsed in a corresponding data cell of the graphical representation and that overlays the parsed data value over the data value; and
providing the user interface for display.

9. The method of claim 1, further comprising:
detecting a portion of the text that is being displayed;
parsing only the detected portion of the text;
generating a user interface of that depicts the parsed detected portion of the text; and
providing the user interface for display.

10. A non-transitory computer-readable medium for storing instructions, the instructions comprising:
one or more instructions that, when executed by a processor of a device, cause the processor to:
receive text that includes data values,
convert the text to identify data types associated with the data values,
generate, based on the data values and the data types, a graphical representation of the text that includes data cells corresponding to the data values,
provide the graphical representation for display,
receive one or more selections of one or more data cells in the graphical representation,
store the one or more selections as a selection history,
the selection history storing a plurality of selections, and
the plurality of selections including the one or more selections and one or more other selections received prior to receiving the one or more selections,
provide the selection history for display,
receive a selection of a particular selection, of the plurality of selections, from the selection history,
identify one or more data cells associated with the particular selection in the graphical representation,
receive an instruction to import the particular selection to a technical computing environment,
highlight, based on the instruction, only the one or more data cells associated with the particular selection in the graphical representation,
the one or more data cells being associated with the data types,
generate a data container associated with the technical computing environment, based on the particular selection and the data types associated with the one or more data cells of the particular selection, and
provide the data container to the technical computing environment.

11. The non-transitory computer-readable medium of claim 10, where the data container is selected by a user from a list of data containers associated with the technical computing environment.

12. The non-transitory computer-readable medium of claim 10, where the instructions further comprise:
one or more instructions that, when executed by the processor, cause the processor to:

generate a user interface that specifies data types for columns of the text and that permits editing of the specified data types, and provide the user interface for display.

13. The non-transitory computer-readable medium of claim 10, where the instructions further comprise:
one or more instructions that, when executed by the processor, cause the processor to:
determine that the text includes fixed-width columns,
select default fixed-width columns based on the fixed-width columns,
generate a user interface that includes the default fixed-width columns and that permits temporary expansion of the default fixed-width columns, and
provide the user interface for display.

14. The non-transitory computer-readable medium of claim 10, where the instructions further comprise:
one or more instructions that, when executed by the processor, cause the processor to:
determine delimiters provided between the data values of the text,
generate a user interface that identifies the delimiters,
provide the user interface for display,
detect selection of one or more delimiters, of the delimiters identified in the user interface, and
conditionally apply the selected one or more delimiters to the text.

15. The non-transitory computer-readable medium of claim 10, where the instructions further comprise:
one or more instructions that, when executed by the processor, cause the processor to:
identify a default header row in the text,
generate a user interface that includes column headers based on the default header row,
provide the user interface for display,
receive an edit to a particular column header of the column headers, and
change the particular column header based on the edit.

16. The non-transitory computer-readable medium of claim 10, where the instructions further comprise:
one or more instructions that, when executed by the processor, cause the processor to:
generate a user interface that explains how a data value is parsed in a corresponding data cell of the graphical representation and that overlays the parsed data value over the data value, and
provide the user interface for display.

17. The non-transitory computer-readable medium of claim 10, where the instructions further comprise:
one or more instructions that, when executed by the processor, cause the processor to:
detect a portion of the text that is being displayed,
parse only the detected portion of the text,
generate a user interface that depicts the parsed detected portion of the text, and
provide the user interface for display.

18. A device comprising:
one or more processors to:
receive text that includes data values,
parse the text to identify data types associated with the data values,
generate, based on the data values and the data types, a graphical representation of the text that includes data cells corresponding to the data values,
provide the graphical representation for display,
receive one or more selections of one or more data cells in the graphical representation,
store the one or more selections as a selection history, the selection history storing a plurality of selections, and
the plurality of selections including the one or more selections and one or more other selections received prior to receiving the one or more selections,
provide the selection history for display,
receive a selection of a particular selection, of the one or more selections, from the selection history,
identify one or more data cells associated with the particular selection in the graphical representation,
receive an instruction to import the particular selection to a technical computing environment,
highlight, based on the instruction, only the one or more data cells, associated with the particular selection, in the graphical representation,
the one or more data cells being associated with the data types,
generate a data container associated with the technical computing environment, based on the particular selection and the identified data types associated with the one or more data cells of the particular selection, and
provide the data container to the technical computing environment.

19. The device of claim 18, where the one or more processors are further to:
generate a user interface that specifies data types for columns of the text and that permits editing of the specified data types, and
provide the user interface for display.

20. The device of claim 18, where the one or more processors are further to:
determine that the text includes fixed-width columns,
select default fixed-width columns based on the fixed-width columns,
generate a user interface that includes the default fixed-width columns and that permits temporary expansion of the default fixed-width columns, and
provide the user interface for display.

21. The device of claim 18, where the one or more processors are further to:
determine delimiters provided between the data values of the text,
generate a user interface that identifies the delimiters,
provide the user interface for display,
detect selection of one or more delimiters, of the delimiters identified in the user interface, and
conditionally apply the selected one or more delimiters to the text.

22. The device of claim 18, where the one or more processors are further to:
identify a default header row in the text,
generate a user interface that includes column headers based on the default header row,
provide the user interface for display,
receive an edit to a particular column header of the column headers, and
change the particular column header based on the edit.

23. The device of claim 18, where the one or more processors are further to:
generate a user interface that explains how a data value is parsed in a corresponding data cell of the graphical representation and that overlays the parsed data value over the data value, and
provide the user interface for display.

24. The device of claim 18, where the one or more processors are further to:
 detect a portion of the text that is being displayed,
 parse only the detected portion of the text,
 generate a user interface of that depicts the parsed detected portion of the text, and
 provide the user interface for display.

25. The device of claim 18, where the data container is selected by a user from a list of data containers associated with the technical computing environment.

26. The device of claim 18, where, when parsing the text to identify the data types, the one or more processors are to:
 determine default data types for the data values of the text.

\* \* \* \* \*